United States Patent Office 2,888,359
Patented May 26, 1959

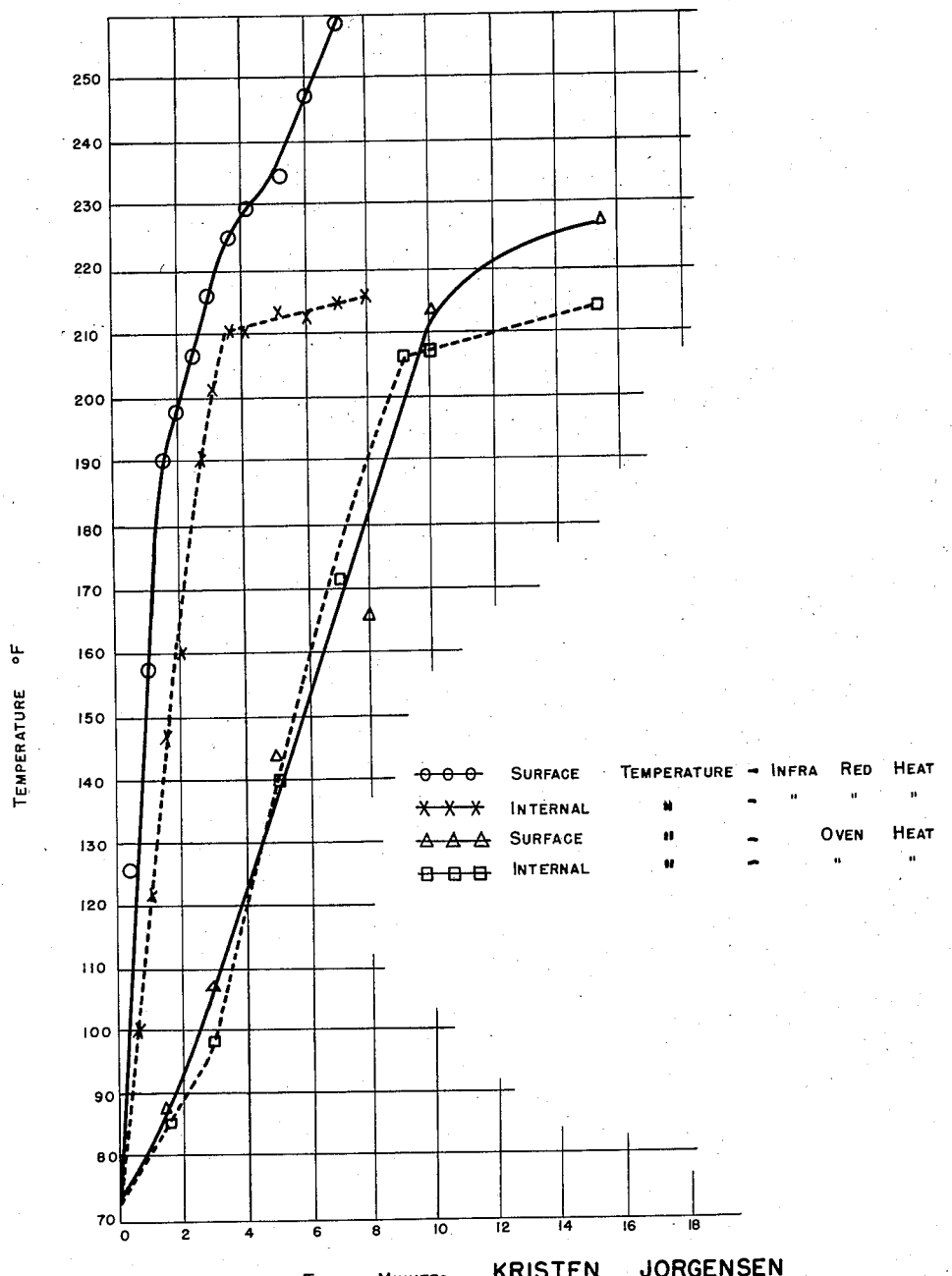

2,888,359

MATERIAL FOR AND PROCESS OF PATCHING PLYWOOD SHEETS

Kristen Jorgensen and Robert M. Williams, Seattle, and Lewis S. Miller, Bellevue, Wash., assignors to American-Marietta Company, Adhesive, Resin and Chemical Division, Seattle, Wash., a corporation of Illinois Application March 22, 1954, Serial No. 417,893

2 Claims. (Cl. 117—2)

Our invention relates to the art of patching plywood and more particularly to a material for and process of patching plywood sheets. Briefly, our invention concerns the patching of open cavities in the outer sheets of plywood by the use of material including a thermosetting resin which foams upon application of radiant heat producing an expanding of the material with finely divided cells. When the material is dry it will not have shrunk so as to leave openings or recesses in the sheet; but, instead, material will be disposed beyond the faces of the veneer sheet which excess may be removed by sanding.

Face veneer sheets used in plywood may have open cavities which should be filled particularly if the plywood is to be overlaid with thin paper-like sheets. In present practice the cavities may be filled in finished plywood faces by routing out the defect and gluing in a patch of veneer. This process is expensive because of the labor required. When plywood has to have glued to it a plastic-impregnated paper face, commonly called an overlay, or a thin sheet of hardwood veneer, it is important to have as the core a solid sheet of plywood without defects to prevent blows and to prevent exposure of the thin overlay to puncture because of the absence of a solid backing.

Defects in the faces of plywood may be filled by putty-like materials. If the panel is to be overlaid, however, it is necessary that the material in the patched hole be unaffected by the subsequent heat and pressure of the overlaying process. Most putty materials of the so-called non-shrinking type now available are based on thermoplastic binders which do not remain rigid and level in the overlaying process. Furthermore, it is practically impossible to fill the defects with materials of this type to the correct level without small depressions.

There have also been tried in the art various combinations of thermosetting resins and fillers which could be used to fill the defects but these have been cured by hot pressing and consequently require careful judgment as to the correct amount to apply in order to allow for shrinkage. None of these previous patching methods using compounded putty-like materials have been successful in overcoming the shrinkage normally to be expected in the cure of thermosetting resin-filler combinations and for this reason have not been generally used to patch the face defects of plywood panels. For the above reasons, none of the aforementioned putty-like materials have been used to fill defects in plywood which is designed to be used as core material for paper, plastic, or veneer overlayments.

The use of putty-like material is an economical way of patching the sheet and it is desirable to develop a better method and material for the same. The present mix differs from many of these prior materials in having a relatively large proportion of less absorptive filler whereby less resin solution is required and whereby the mix has a lower volatile content at a usable viscosity which allows it to form the desired foam structure on heating. The reason why the present patching material is more economical than other patching materials is that it can be applied with less careful attention by the operator because the subsequent swelling of the material completely fills the void or depression and when cured the material can be sanded level. Another reason is because this characteristic of the material appears to permit mechanical or machine application.

An object of our invention includes therefore: to provide a patching compound suitable for use in patching outer sheets of plywood which will not shrink upon application of heat and which instead will expand; to devise a method of patching plywood with putty-like material which will result in the area of the cavity being completely filled and co-planar with the adjacent surfaces of the plywood; and to provide a method of filling these openings, particularly in veneers to be overlaid, which is more economical and of higher quality than those previously used in the art. The nature of our invention, together with additional objectives and advantages thereof, will be best understood from the following description.

The single figure is a graph showing a temperature-time comparison of infra-red and oven heat acting on a sample of patching material formed according to Example 2.

Our invention involves the filling of a defect in a plywood panel or other cellulosic fibrous surface using a thermosetting resin such as a phenolic, resorcinol, urea, melamine resin, or combination of the same. The resin is used in combination with certain fillers to form a mixture which will foam and expand upon application of heat, due to the evaporation of moisture and volatile materials, and will cure into a hard, porous or cellular mass. After the shrinkage, if any, has taken place in the foamed material, the excess can be removed by sanding, cutting, or other means. To obtain the desired cellular structure adequately foamed and free from large holes, it is highly desirable, for reasons to be explained hereafter, that the initial heat during the foaming stage be applied in the form of radiant heat, as for instance using infra-red heating lamps or radiant heating tubes. After the necessary expansion by foaming has taken place, the heating can be continued either by use of a radiant heating source or by conventional heating means.

EXAMPLES

The following are specific examples of suitable mixtures for use in this method of patching:

*Example 1*

| | Parts by weight |
|---|---|
| Resorcinol resin | 100 |
| Plaster of Paris | 40 |
| Precipitated chalk | 40 |
| Silvacon 509 | 20 |
| Asbestos shorts | 5 |
| Walnut shell flour | 5 |
| Paraform powder | 5 |

The resorcinol resins suitable are made similar to the resins described in U.S. Patents Nos. 2,385,372; 2,385,373; 2,385,374; 2,414,415; 2,443,197 and 2,478,943; issued to Rhodes; and U.S. Patent No. 2,385,370, issued to Norton. The resin has approximately 60% solids content in a solution with water and ethyl alcohol. Silvacon 509 is a product of Weyerhaeuser Timber Co., Tacoma, Washington, and has approximately the following analysis:

| | Parts by weight |
|---|---|
| Fiber fraction of free bark | 64 |
| Lignin | 35 |
| Extraneous material | 1 |

The resorcinol resin of Examples 1 and 2, more particularly, was formed as follows:

Mix resorcinol and formaldehyde in the proportions of 0.3 mole of formaldehyde in aqueous solution to 1.0 mole of resorcinol. Increase the temperature slightly, agitate the mixture until the resorcinol is completely dissolved, and then adjust the pH to a value of 4.2 plus or minus 0.1. Increase the temperature of the reaction mixture until it boils. Continue to reflux the mixture until a suitable stage of condensation is reached. In this case this point was reached when the resin had a viscosity of 92 cps. measured at 25 degrees C. Cool the resin and add an additional 0.3 mole of formaldehyde for each mole of resorcinol originally added. When the addition has been effected again increase the temperature until the mixture boils and continue to reflux until the resin has a viscosity of approximately 600 cps., measured at 25 degrees C. At this point add 0.03 mole of caustic soda in aqueous solution for each mole of resorcinol originally added. Continue at reflux temperature an additional 30 minutes, then cool and add sufficient methanol to adjust the final viscosity to a desired value. The resin is then ready to use.

*Example 2*

| | Parts by weight |
|---|---|
| Resorcinol resin (60% solids) | 100 |
| Plaster of Paris | 120 |
| Silvacon 509 | 20 |
| Paraform powder | 10 |
| Asbestos shorts | 5 |

*Example 3*

| | Parts by weight |
|---|---|
| Phenolic resin (40% solids) | 100 |
| Precipitated chalk | 50 |
| Silvacon 509 | 50 |

The resin is similar to that described in U.S. Patent No. 2,457,493, issued to Redfern, and appears in an aqueous solution. More particularly, the resin was formed as follows:

Mix phenol and formaldehyde, both in aqueous solution, in the proportion of 2.5 moles of formaldehyde to 1.0 mole of phenol. Slowly add 0.52 mole of caustic soda in aqueous solution for each mole of phenol. When the caustic soda has been added bring the reaction mixture to the boiling point in 50 minutes. Continue the reaction at the boiling point until the viscosity of the resin reaches 50 cps., measured at 25 degrees C. Eight minutes after this point has been reached commence cooling the resin at such a rate that in 30 minutes the temperature will drop to 80 degrees C. Continue the reaction at 80 degrees C until a viscosity of 370 cps., measured at 25 degrees C., is reached. Ten minutes after this point add 0.16 mole of caustic soda. Continue at 80 degrees C. until a viscosity of 182 cps. is reached. Ten minutes after this point, cool the resin rapidly and remove to storage when cold.

*Example 4*

| | Parts by weight |
|---|---|
| Phenolic resin (70% solids) | 100 |
| Silvacon 509 | 30 |
| Talc | 90 |
| Mixed alkenesulfonic acid | 6 |

The resin is made as follows: mix formaldehyde and phenol in the proportion of 2.0 moles of formaldehyde in aqueous solution to 1.0 phenol and add enough caustic soda to raise the pH to approximately 9.2. Raise the temperature of the mixture and maintain it at an elevated temperature until the free formaldehyde drops to a value below .5%. When this point is reached adjust the pH to approximately 8. The resin may then be dehydrated until the desired solids content is reached. The resin is supplied to the mixture in an aqueous solution and may have 50 or 70% solids content as the resultant viscosity will be approximately the same.

*Example 5*

| | Parts by weight |
|---|---|
| Urea resin (aqueous solution 68% solids content) | 100 |
| Talc | 50 |
| Silvacon 509 | 50 |
| Diammonium phosphate | 13 |
| Urea | 6 |
| Disodium phosphate | 0.5 |

The urea resin is made as follows: One mole of urea is added to two moles of formaldehyde in an aqueous solution that has been adjusted to a pH of approximately 4.5. The solution is gently refluxed long enough to carry the condensation to a suitable stage, after which the solution is neutralized. The resin may then be dehydrated to the desired solids content.

*Example 6*

| | Parts by weight |
|---|---|
| Melamine resin | 100 |
| Water | 88 |
| Hydrochloric acid, concentrated | 10 |
| Silvacon 509 | 50 |
| A.S.P. 400 | 50 |

The melamine resin may be prepared, similar to the method of U.S. Patent No. 2,529,856, by mixing 10 moles of formaldehyde to 3 moles of melamine. Then adjust the pH to 7–8 and heat under reflux conditions until a clear solution is obtained. Add approximately 20 moles of methanol as well as a small amount of oxalic acid. Boil gently for a few minutes and then make alkaline (pH equals 8.0–8.5). The water is then removed by spray drying or dehydrating under vacuum. This is a spray-dried, powdered resin and for that reason water is added to the mix. The A.S.P. 400 is a soft, white aluminum silicate inert having an average particle size of approximately 4.2 microns and is sold under that name by Edgar Brothers Co. This formulation was found to cure in three minutes using infra-red heat lamps, the mixture swelling or foaming sufficiently during this time.

*Example 7*

| | Gms. |
|---|---|
| Resorcinol resin | 100 |
| Paraform | 10 |
| Asbestos | 10 |
| Silvacon 509 | 30 |
| Plaster of Paris | 20 |

The resin is made as described under Examples 1 and 2.

All of the examples described above foamed up above the surrounding surface and completely filled the defect being patched. Any shrinkage which may occur during the final stages of the curing period is compensated for by the initial rise of the material.

RESINS

From the examples described above, it is shown that the thermosetting urea, resorcinol, phenolic and melamine resins can be used in the formulation. Urea, resorcinol, phenolic and melamine resins are the commercially practical resins at present, but other thermosetting resins could also be used as long as they have a reasonable life at room temperatures and are water soluble or are soluble in solvents such as alcohol, etc. It will be noted that, in each of the examples, some material is available for evaporation, i.e., water or other solvents such as alcohol. If powdered resin were used of course water or other volatiles would be added. The foaming results from evaporation rather than from a breaking down of a compound to free a gas. The material when mixed has a heavy viscosity and the evaporation causes foaming and expansion of the material.

HARDENERS

In the examples the paraform powder, the alkenesulfonic acid, hydrochloric acid, and the diammonium phosphate are hardeners for the resorcinol, phenolic, melamine and urea resins respectively. It will be noted that in Example 3, no hardener is set forth. This is because the particular resin used will cure without the addition of a hardener. Ammonium chloride or similar acid salts also can be used as hardeners for the urea resin and acids can be used if suitably buffered. In the case of the acid curing phenolic resins of Example 4, mixed alkenesulfonic acid was used to effect the cure of the resin but other acids will be understood to be usable with equal effect and acid salts such as boron trifluoride complexes can be used. Aqueous solutions of formaldehyde also could be used as hardeners for resorcinol resin. Other hardeners for the melamine resin would include various acid salts and suitably buffered acids.

FILLERS

Many inert fillers can be used in place of those mentioned in the examples, i.e., china clay can be substituted for the talc or chalk. Another material would be bentonite. A term generically describing these materials would be mineral fillers. Mineral fillers are preferable because of their non-swelling characteristics but other fillers could be used even though they have some swelling. The amount of filler used is governed by the initial viscosity of the mix. The initial viscosity should not be below 200,000 cps. at 25 degrees C. if the material is to perform satisfactorily. A common range of viscosity is from an initial viscosity as low as 240,000 cps. at 25 degrees C. to a final viscosity of above 2,000,000 cps. at 25 degrees C. near the end of the usable pot life. The resorcinol formulation given above would have an initial viscosity of approximately 600,000 cps. at 25 degrees C. The exact amount used may vary due to differences in water absorbency and drying. If the fibrous material were omitted, then the filler would be increased.

FIBROUS MATERIAL

The Silvacon 509 and the asbestos are added to give better sanding properties but otherwise are not necessary in the formulation to produce a foaming structure. A patch which has no fibers cannot be sanded by a drum sander without serious chipping but other means of sanding can still be used. Cost-wise, the use of a drum sander is highly desirable. Other relatively non-swelling inert fibrous material would accomplish the same purpose. These fibrous materials give a patch with greater craze resistance (resistance against fine cracking) and a compressibility closer to that of wood. If more asbestos were added, it would lessen the rise of the material by thickening the mix due to water absorption. Mineral filler is important to the extender because it would be difficult to control the process with greater quantities of the fibrous material due to their absorption of water. The resorcinal patching compound in use has about 16% fibrous material in the mixed compound. The upper limit of operability is probably about 30%. There is no lower limit. These materials may be described as relatively non-swelling, fibrous materials which are inert in the mixture. Fibres with some swelling can be used but it is preferable to use fibers as non-swelling as possible.

MECHANICAL OPERATIONS

The patching material is formed by blending the mineral filler, hardener and fibrous material in a dry mixture and adding the same to the thermosetting resin and mixing. The dry materials are mixed when supplied to the consumer who mixes the filler with the resin immediately prior to use. There is no chemical reaction between the filler and resin except for reaction of the hardener. The mixed material is applied by means of a putty knife, roller, or other suitable spreading equipment in sufficient quantity to substantially fill the opening to be patched. After heating, excess patching compound will be found lying outside of the faces of the veneer, which can be removed by sanding or other means. The excess may project as much as 1/16 to 1/8 inch. The patched sheet may then be overlaid and there is no recess or opening in the sheet to cause a blow or blister in the plywood product.

HEATING

It has been found necessary to use radiant heating for at least the initial stage of the process. This is because heating by means such as the ordinary convection oven results in hardening and drying of the surface before the material has a chance to expand sufficiently. The desired foaming action is thus inhibited and when it occurs it is likely to be in the form of "blow-outs" leaving voids in the surface of the patch as large as 1/4 inch in diameter. Such voids are too large to be successfully bridged by the overlay sheet and the purpose of the patch is defeated. The graph of the figure illustrates the difference between heating with infra-red heat and heating with oven heat.

The radiant source may be infra-red heat lamps or tubes such as are commercially available. The heat source should be approximately of such a size and placed at such a distance from the panel surface that a surface temperature of approximately 230 degrees Fahrenheit is obtained in four minutes on the surface of the patch. After the initial rise has taken place and the patch is hard to the touch, usually in about two minutes, curing may be completed by heating with any of the conventional heating means or by the continuation of the radiant heating. The final stages of the curing can be completed by stacking the panels for a period of time.

Examples of the heating process would be four minutes using the infra-red heat, or two minutes under infra-red heat and seven minutes in an oven set at 150 degrees centigrade. In both cases, the material is then stacked for 24 hours to complete the cure. The stack time required may be reduced by stacking at elevated temperatures. For instance, by stacking at 100 degrees centigrade one hour the shrinkage is substantially complete and the panel ready for sanding. It has been found in the case of acid phenolic resin based patching compounds the 24 hour stack time is unnecessary and can be eliminated.

It may be considered that the radiant heat should be conducted for a minimum of two minutes at such intensity as to reach a temperature of approximately 190 degrees F. on the surface of the patch or 150 degrees F. in the center of that patch at the end of that period.

The foaming of the material is entirely due to the formation of steam or other vaporized solvent present in the resin. The critical factor in the formation of the cellular mass is the rate of cure of the resin and its relationship to the time of formation of the steam. If the patching compound is hard, especially on the surface, before the steam is formed, then the steam formation will result in large gas pockets being blown in the mixture. If, on the other hand, the steam is formed while the mixture is still relatively uncured then it will simply boil off and the patch will not foam to any degree. By using infrared heat it is possible to form steam at just the right time as the graph of the figure shows. The resin cures in approximately four minutes with the infra-red heat. As shown on the graph, the internal temperature approaches the boiling point of water in three minutes with the infra-red heat. On the other hand, the steam is not formed until nine minutes with oven heat. The result is that large gas pockets are formed.

SUMMARY

The chief use of our invention will be in the patching of plywood, particularly sheets to be overlaid by a thin veneer. The process could also be used on other cellulosic fibrous materials, such as boards.

The above-described method should be distinguished from the use of resins to strengthen hollow metal structures, such as aircraft wings, and to manufacture light weight insulation blocks and packaging materials. These practices are conducted by foaming a material, including resin, by whipping air into it or by the inclusion of gas-releasing compounds that react to release nitrogen or carbon dioxide. These resins are usually set by quick-acting catalysts and do not, as a rule, require the use of external heat in the process. In our process the foaming results instead from simple evaporation of water or a solvent. The prior material has too large cells and is much too fragile for the present use.

The way in which the objectives of our invention have been met and the commercial advantages of the same will be understood from the preceding description. We do not wish to limit our invention to the precise examples given but wish to cover those modifications thereof within the skill of the art, as defined in the appended claims.

We claim:

1. The method of patching open cavities in a wooden panel, comprising: forming a foamable paste mixture of water, thermosetting resin solids selected from the group of resins consisting of resorcinol, phenolic, melamine and urea resins, a resin hardener, an inert mineral filler, and non-swelling fibrous material, said paste having an initial viscosity of at least 200,000 centipoises at 25° C.; depositing a portion of said paste mixture in an open cavity in a wooden panel to fill the same approximately flush with the surface surrounding said cavity; foaming and swelling the paste mixture in said filled cavity to a volume greater than that of the cavity by directly exposing said panel and its cavity filling otherwise unconfined to a source of dry radiant heat; raising the interior temperature of said cavity filling to the vapor point of water while maintaining the exposed surface of said cavity filling permeable to diffusion of moisture vapor; and volatizing and diffusing from said cavity filling substantially all of said water while simultaneously curing the resin component of said cavity filling.

2. In the method of claim 1, removing the excess material in the cavity to a surface coplanar with the face of the wooden panel.

References Cited in the file of this patent

UNITED STATES PATENTS

| | | |
|---|---|---|
| 255,139 | Burr | Mar. 21, 1882 |
| 2,388,042 | Daily | Oct. 30, 1945 |
| 2,419,614 | Welch | Apr. 29, 1947 |
| 2,567,952 | Lewis | Sept. 18, 1951 |
| 2,630,395 | McCullough | Mar. 3, 1953 |
| 2,689,980 | Opavsky | Sept. 28, 1954 |
| 2,706,311 | Durst et al. | Apr. 19, 1955 |
| 2,744,291 | Stastny et al. | May 8, 1956 |

OTHER REFERENCES

"Continuous Structural Board From Sawdust," pp. 89–91, September 1947, Modern Plastics.

"Resins Bond Wood Waste Board," pp. 59–62, February 1949, No. 6, Modern Plastics.